United States Patent [19]
Creaco et al.

[11] Patent Number: 5,311,112
[45] Date of Patent: May 10, 1994

[54] AUTOMATIC BATTERY CHARGING SYSTEM

[75] Inventors: Anthony F. Creaco, College Point; Ernest A. Kussmaul, Sayville, both of N.Y.

[73] Assignee: Kussmaul Electronics Company Inc., Sayville, N.Y.

[21] Appl. No.: 22,939

[22] Filed: Feb. 26, 1993

[51] Int. Cl.$^5$ .................................. H01M 10/44
[52] U.S. Cl. .................................. 320/15; 320/20; 320/48; 320/39
[58] Field of Search .................. 320/15, 20, 48, 39

[56] References Cited
U.S. PATENT DOCUMENTS

| | | |
|---|---|---|
| 4,746,852 | 5/1988 | Martin .................. 320/20 |
| 4,849,682 | 7/1989 | Bauer et al. .................. 320/15 |
| 5,191,291 | 3/1993 | Taylor .................. 320/48 X |

Primary Examiner—R. J. Hickey
Attorney, Agent, or Firm—Edward H. Loveman

[57] ABSTRACT

This automatic battery charging circuit has two independent channels for charging first and second batteries respectively. Circuit control means in the battery charging circuit enable it to provide charging current in proportion to the state of charge of the two batteries. First and second electronic bar displays are connected to the two channels by wires. The channels provide readings which indicate the state of charge of each battery. The state of charge of each battery is sensed only when no charging current flows to each battery. Computer components in the circuit control means compute the charge level of each battery and this charge level is indicated by the respective bar displays.

5 Claims, 3 Drawing Sheets

AUTOMATIC BATTERY CHARGING SYSTEM

BACKGROUND OF THE INVENTION

1. Field of the Invention

This invention concerns an automatic dual channel battery charger for charging two batteries simultaneously or alternately under control of an electronic circuit; and more specifically concerns a dual battery charger wherein the battery voltage is sensed by time sharing of the charging wires.

2. Description of the Prior Art

While automatic electronic battery chargers are known in the art they all differ in important respects from the present invention. The prior chargers employed ammeters to show charge current, or expanded scale voltmeters which showed battery voltage. Neither the prior i. ammeters nor the voltmeters produced an indication of charge level, and none showed the charge level on graphic easy to read displays. The prior chargers of which the one described in U.S. Pat. No. 4,977,364 is typical, measured charge of low power alkaline batteries as contrasted with the present invention, which provides the facilities to charge large capacity, heavy duty lead-acid batteries having nominal output ratings of 6, 12, 24, or more volts.

SUMMARY OF THE INVENTION

The present charger has the following unique features, among others:

1. The charger has two independent channels in which two batteries are charged simultaneously. The circuitry provides automatic charging current to the two batteries in proportion to their respective state of charge.

2. Sense of battery terminal voltage is obtained by time sharing the charging will during periods when zero current flows therein.

3. Battery charge of each battery is indicated by bar graph displays.

4. The charge level of each battery is computed by subtracting current correction from measured terminal voltage.

5. The dual channel battery charger provides two independent float voltage charges in the Float Voltage Mode wherein two separate batteries have a common batteries share a common ground.

Battery voltage is sensed through the charging wires by time sharing the function of those wires between charging and sensing. By interrupting charge current for a short period of time, the charger measures true battery voltage and ignores the "IR" or resistance drops through the wires and the battery internal resistance. The charger then resumes charging and ceases to measure the battery voltage until the next interval.

The charger has a Total Current Limit Mode which takes priority over the Float Voltage Mode when it is sensed that the current limit would be exceeded in the Float Voltage Mode. The Total Current has the unique feature of automatically allocating a majority of the current limit to the weaker battery, and a minority of the current limit to the stronger battery, that is, in proportion to the relative strength of each battery. This property insures that the full capacity of the charger is being allocated in the proportions required by each battery.

The charger has an additional unique feature of continuously computing the charge level in of each battery in both described modes. This is accomplished by performing two types of voltage measurements at the charger output terminals and processing these measurements with a special processing circuit. These measurements are the voltage without charge current; and the voltage with charge current flowing.

The battery charger contains a unique type of display which shows the charge level of each battery in ten (10) discrete steps from low to full charge, in bar graph form.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENT

Figure 1:
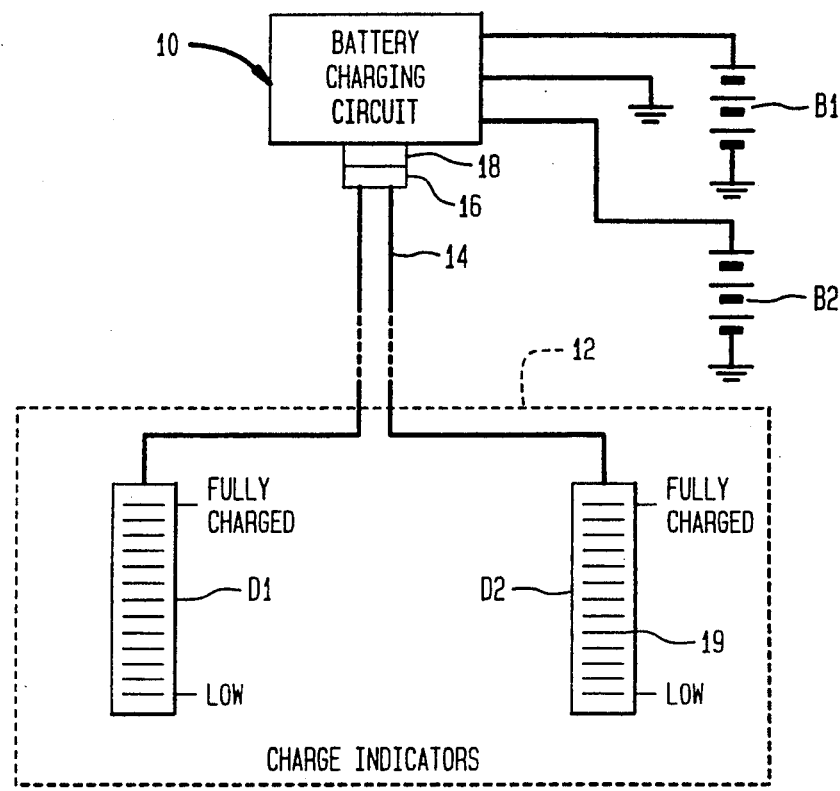
FIG. 1 is a basic block diagram of the battery charging system, with independent bar graph displays of charge of the individual batteries under charge.

In the following description, reference is made to a number of symbols which are listed and defined in the GLOSSARY at the end of the description. This GLOSSARY should be consulted to determine the exact meaning intended for each listed symbol. Referring now to the drawings wherein like reference characters designate like or corresponding parts throughout, there is illustrated in FIG. 1, a block diagram of the basic system wherein a pair of Batteries B1 and B2, which are to be charged, are connected to output terminals of a battery charging circuit, generally designated as reference numeral 10 (shown in greater detail in FIG. 2 ). A remotely located display assembly 12 has two charging indicators D1 and D2 which are connected via a cable 14 and a plug 16 to a pair of socket output terminals 18 of the charger circuit 10. The display assembly 12 has two independent displays D1, D2 each of which has light emitting diodes 19 which display Low Charge to Full Charge for each battery B1, B2. The display assembly 12 converts the charge levels of the batteries B1, B2 to two graphical and easy to read displays respective D1, D2. This contrasts with former technologies which employed ammeters to show charge current, or expanded scale voltmeters which show battery voltage. Neither of the prior technologies produced an indication of charge level and none showed the charge level on a graphical easy to read display.

Figure 2:
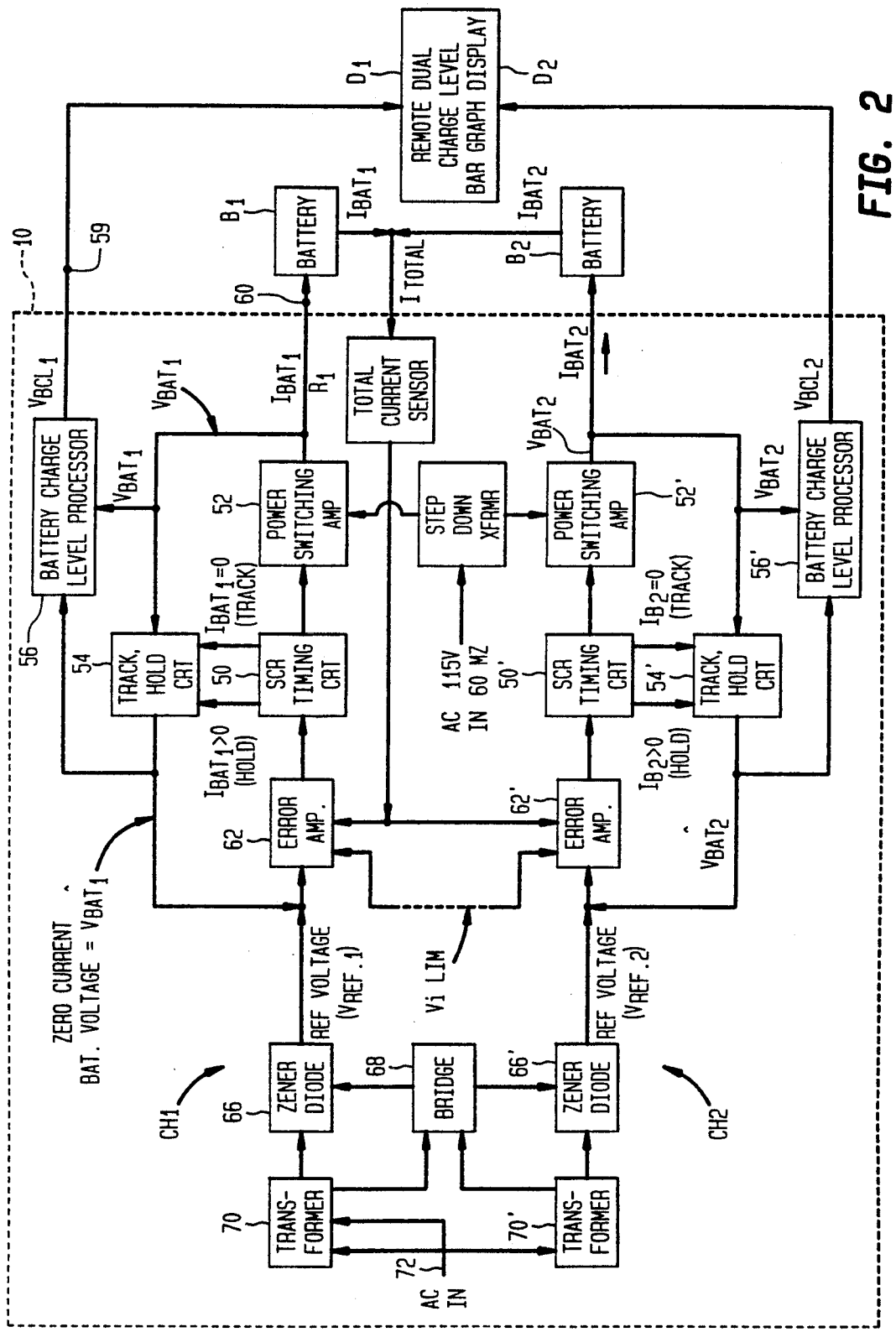
FIG. 2 is a block diagram of a charging circuit for the dual channel float battery charger with batteries and remote charge indicators.

Turning now to FIG. 2 which illustrates a block diagram of the charging circuit 10 for the dual channel independent float charger, with connections to the batteries B1 and B2 under charge and the remote cable connections 14 between the charging circuit 10 and the display assembly 12. The circuit 10 has two similar independent channels CH1 and CH2 for charging the respective batteries B1, B2 and for indicating the charge level by the indicators D1 and D2 respectively.

An SCR Timing Circuit 50 in the channel CH1 triggers a Power Switching Amplifier 52 to provide the charging current IBAT1 to Battery B1. The charging current IBAT1 is periodically interrupted so that the voltage of battery B1 can be measured at the charger terminals when zero charge current exists. A Track and Hold circuit 54 captures this voltage VBAT1 and holds it for both float voltage control and for computation of Battery Charge Level by a Battery Charge Level Processor 56. The Battery Charge Level Processor 56 utilizes the Zero Current Battery Voltage VBAT1 and the battery voltage at an output charger terminals 59, 1 60 when the charge current VBAT1 is flowing. The processor 56 computes the charge level and displays it in bar graph form at the remote dual charge level Bar Graph Display D1. Channel CH2 operates in the same manner as described for channel CH1.

When the system is in a Float Voltage Control, the VBAT1 voltage is compared to a reference voltage V Ref 1 to form an error signal at Error Amplifier 62 which controls the SCR Timing Circuit 50. This in turn provides a charge command switching signal to the Power Switching Amplifier 52 and a Track/Hold command to the Track and Hold Circuit 54. The Error Amplifier 62 also receives a measurement of the total charge current (IBAT1+IBAT2), and compares this to the total current limit reference voltage ViLim Error Amplifiers 62, 62'. If a low level charge in either or both batteries would cause this preset total current limit to be exceeded, the condition would be rapidly detected by the Error Amplifier 62 and the Error Amplifier 62'. At the same time, the float control loops in both channels are opened and replaced with a single Interactive Total Current Limit Control loop. In this current limit mode, 11 the stronger battery will automatically receive the smaller charge current while the weaker i, battery will receive the larger charge current. This allocation will be in accordance with the following equations:

$$Ibat1 = K1*Vilim + K2*(Vbat2\char`\^ - Vbat1\char`\^)$$

$$Ibat2 = K1*Vilim + K2*(Vbat2\char`\^ - Vbat1\char`\^)$$

Note that by adding the above equations, Ibat1+Ibat2=2*KI*ViLim, which is a constant and equal to the preset total current limit. Also note that if Vbat2 ^ is greater than Vbat1 ^, Ibat1 will be greater than Ibat2 and vice-versa.]

True Battery Voltage Sensing by Time Sharing the Charge Current Wires

FIG. 2 diagrammatically shows the SCR Timing Circuit 50 which controls the Power Switching Amplifier 52 and the Track and Hold Circuit 54, which cause charge current to the iii battery B1 to be interrupted every 8 milliseconds for a short interval of time. When the SCR Timing Circuit 50 commands the Power Switching Amplifier 52 to resume charge current flow, it also commands the Track and Hold Circuit 54 to Hold that last value of Battery Voltage (Vbat1 ^) that was read while the charge current was not flowing, until the next current inter option. In the Float Voltage Control, the output of the Track and Hold Circuit 54 (Vbat1 ^) is compared to a voltage to Vref1 from a zener diode 66' which produces an error signal proportional to the difference of these two voltages. It should be observed that the Error Amplifier 62 always utilizes the Zero Current Battery Voltage (Vbat1 ^) even during those charging intervals when the charge current is flowing. This method of charging allows faster, more efficient battery charging while not requiring additional sense wires. Former technologies used separate sense wires for each battery from the charger to the battery to eliminate voltage drop in the charging wires. This technique does not eliminate the voltage drop due to the battery's internal resistance, and it requires four extra wires to connect for a dual charger, ie. two for each battery. Channel CH2 operates identically to channel CH1. Note that the components 50, 52, 54, 56, 62 are duplicated in channel CH2 by corresponding primed numbers. The zener diodes 66 provide reference voltages V ref1 and VRef2. The zener diodes 66 are energized via a diode bridge 68 energized by a transformer 70 from a power supply input 72.

Total Current Limit Mode

Figure 3:
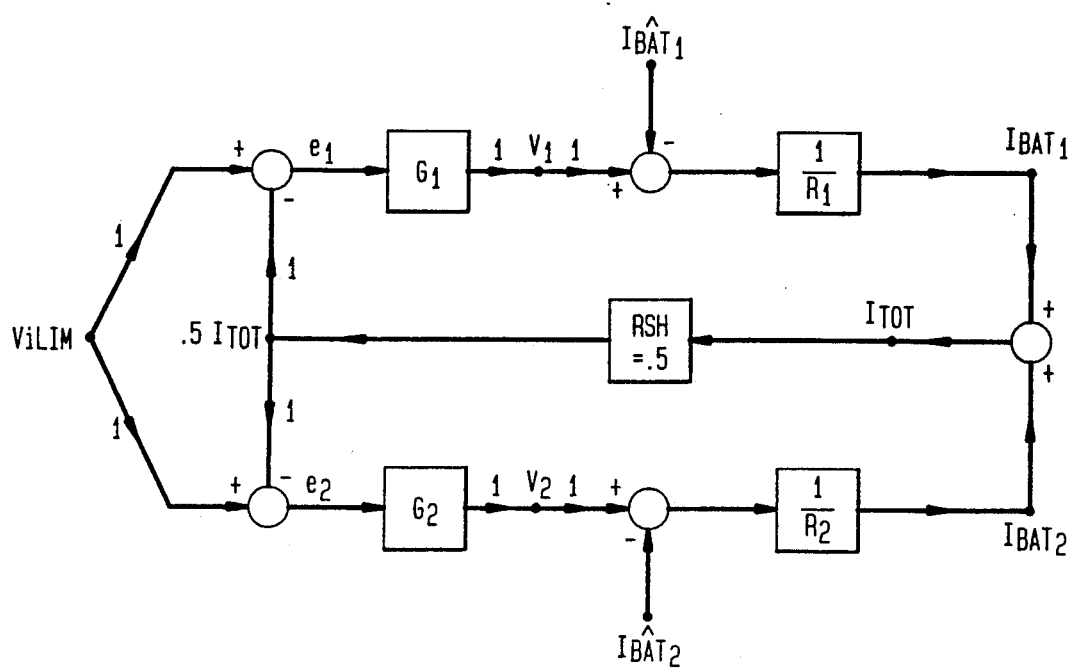
FIG. 3 is a signal flow block diagram for the total current limit mode of the charger.

FIG. 3 depicts a representative Signal Flow Block Diagram of the Total Current Limit Mode. This Mode consists of two interactive current sources, one for each battery, which is controlled by a Total Current Limit reference voltage (ViLim), and the zero current battery voltages (Vbat1 ^ and Vbat2 ^). The gain elements G1 and G2 represent the combined voltage gain of the respective Error Amplifiers 62, the SCR Timing Circuits 50, and the Power Switching Amplifiers 52; see FIG. 2. When the error signal (e1) is amplified by gain G1, an output voltage V1 is produced at the charger terminals which causes a charge current to flow into battery B1 with value:

$$Ibat1 = (V1 - Vbat1\char`\^)/R1,$$

where R1 is the combined resistance of the battery B1 and its lead wires. Likewise $$Ibat2 = (V2 - Vbat2\char`\^)/R2,$$

The common element in these two control loops which creates the interactively of the two current sources is a common current shunt (Rsh) which measures the sum of charge currents in both batteries (Ibat1+Ibat2)=Itot. The transfer function of these current sources are obtained by applying Mason's Rule (Reference 1) to the Signal Flow Block Diagram. When this is accomplished in combination with the following approximations:

$$R1 = R2 = R$$

$$G1 = G2 = G >>> 1$$

The following equations are obtained:

$$Ibat1 = [ViLim/(2*Rsh)] + (Vbat2\char`\^ - Vbat1\char`\^)/2*R$$

$$Ibat2 = [ViLim/(2*Rsh)] - (Vbat2\char`\^ - Vbat1\char`\^)/2*R$$

These equations show how the allocation of battery current is automatically proportioned according to the relative strengths of each battery. It can immediately be seen that if Vbat2 ^ = Vbat1 ^, each battery receives equal charge currents with value Ibat1=Ibat2=ViLim/(2*Rsh).

If $Vbat2\char`\^ > Vbat1\char`\^$ then $Ibat1 = Ibat2 + delta$

If $Vbat2\char`\^ < Vbat1\char`\^$ then $Ibat2 = Ibat1 - delta$ where $delta = (Vbat2\char`\^ - Vbat1\char`\^)/R$ If the current equations are added, it follows that:
Ibat1 + Ibat2 ViLim/Rsh Therefore these equations reflect the properties of the Total Current Limit Mode which are:
  (a) The total current is a constant
  (b) The current allocations for each battery are determined by the difference between each zero current battery voltage.

Figure 4:
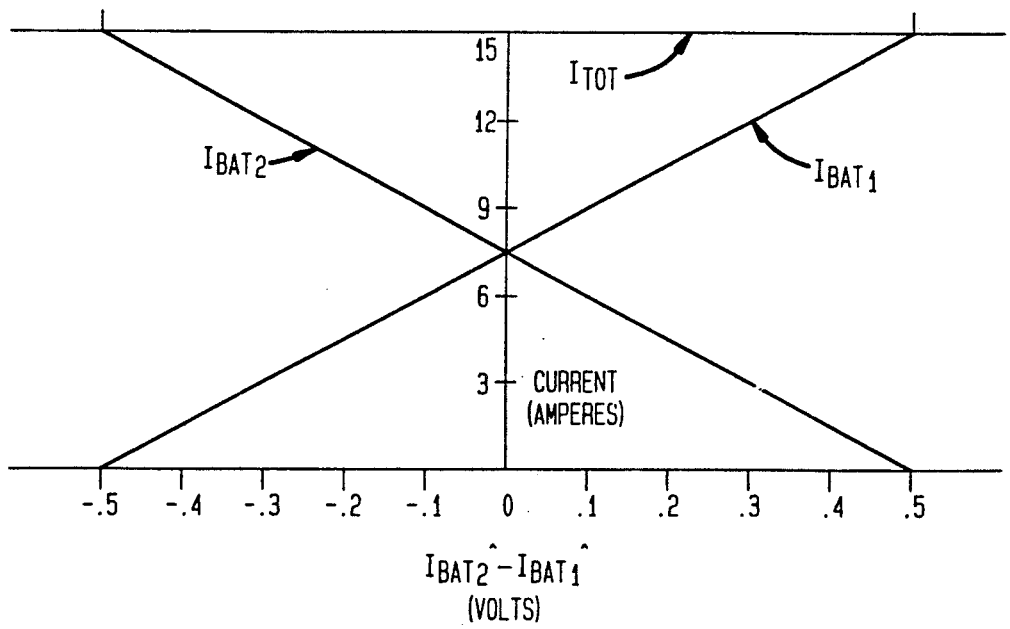
FIG. 4 is a graphic diagram showing how the charging currents are allocated as a function 1 of the difference of the battery voltages.

FIG. 4 is a graphical illustration of how the currents are allocated as a function of the difference of the battery voltages. For this example:
ViLim = 15 and R = 0.03 (ohms).
This method of current control automatical switches from the float voltage control when the batteries require charge current in excess of the charger output capacity. While in the Total Current Limit Mode, when the current drops below the charger capacity, the charger automatically switches back to the Float Voltage Control Mode where each battery will be fully charged and their respective currents will essentially go to zero.

Functions of the Battery Charge Level Processors

Figure 5:
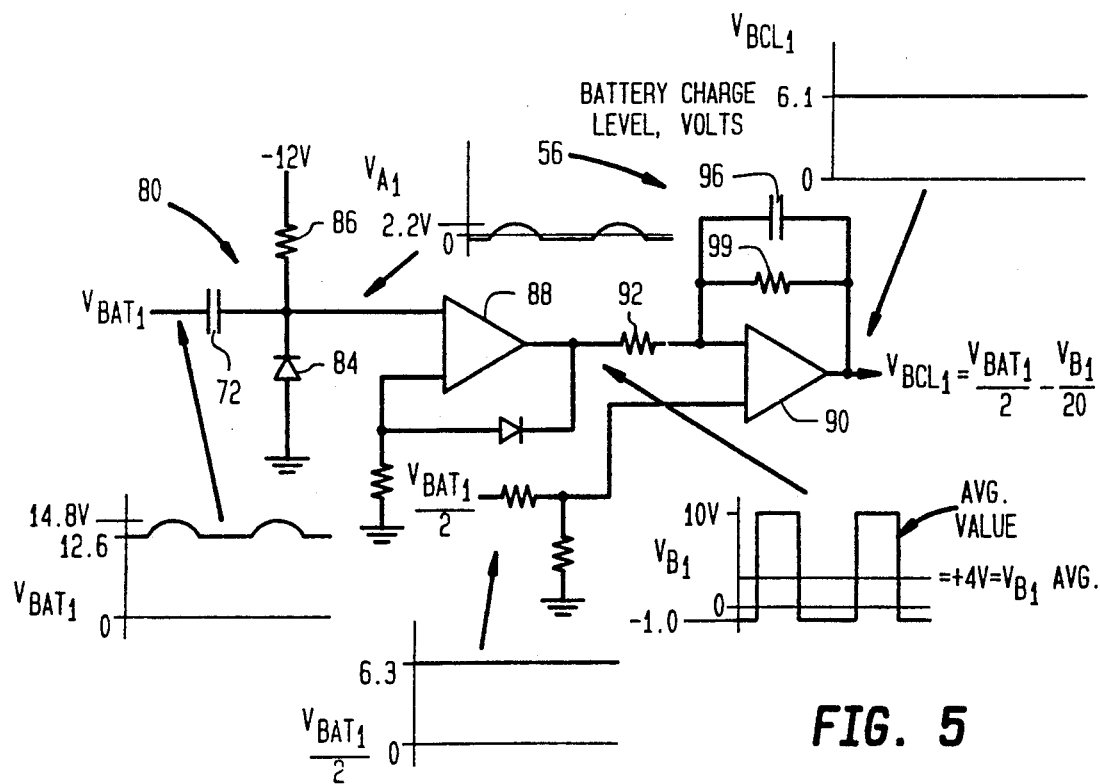
FIG. 5 is a diagram of the circuit and mode of operation of the battery charge level processor.

FIG. 5 shows a functional schematic of Battery Charge Level Processor 56. The Battery Voltage with a charge current going to the battery B1 is applied to a zero volt positive clamp 80 consisting of a capacitor 82, a diode 84, and resistor 86. In this charger, when the charge current is high, the width of the charge current ripple is large. The 80 clamp removes the DC component and sets up the ripple portion for saturation and clipping action performed by an amplifier 88 which saturates to 10 volts when the signal from the clamp 80 is greater than 0, and to −1 volt when the signal from the clamp 80 is less than 0. The Amplifier 88 produces a rectangular pulse vb1 whose pulse width is proportional to charge current. When the battery B1 is at full charge, this charge current will be nearly 0, the pulse width will be very small, and the average value of the rectangular pulse (vblav) will be nearly zero. The rectangular pulse is averaged and weighted in an amplifier 90 in conjunction with a pair of resistors 92, 94 and a capacitor 96. This weighted average of voltage vb1 is subtracted from the zero current battery voltage Vbat1 to form the charge level of battery B1.

In accordance with the following equations Voltage VbcL1 and VbcL2 are:

$$VbcL1 = (Vbat1\char`\^/2) - (Vb1av/20);$$

$$VbcL2 = (Vbat2\char`\^/2) - (Vb2av/20).$$

The example in FIG. 5 shows a battery zero current voltage (Vbat1 ^) with a value 12.6 volts. The charge current switching pulses provided by the Power Switching Amplifier 52 of FIG. 2 causes the battery voltage Vbat1 to vary between 12.6 and 14.8 volts with a wide ripple width. This results in a Vb1 rectangular waveshape with an average value of 4 volts. The 4 volts is divided by 20 and subtracted from Vbat1 ^/2 whose value is 6.3 volts. This results in a charge level voltage of (6.3 − 4/20) or 6.1 volts. The bar graph display D1 is calibrated from 6.1 volts for Low Charge to 6.65 volts for Full Charge. As the battery becomes closer to full charge, Vbat1 ^/2 will increase toward 6.625 volts while the average value of Vb1 will simultaneously decrease toward −1 volt, and thus Vbc1 = Vbat1 ^/2 = 6.675. This would represent a fully charged indication of the Remote Dual Level Bar Graph Display D1.

Glossary

Following is a list of symbols and their meanings as used in the foregoing Description of the Preferred Embodiment of the Invention:

B1, B2: The two batteries charged in channels CH1 and CH2 respectively.

CH1, CH2: The two similar but separate channels in the charger through which the batteries B1 and B2 are charged.

D1, D2: The two charge level display indicators for batteries B1 and B2.

e1, e2: The channel CH1 and CH2 error signals in the Total Current Limit Mode.

G1, G2: The static gain of the Error Amplifiers 62, 62' in each of the two channels CH1 and CH2 of the charger. G is very much greater than 1.

Ibat1: The charge current being provided to battery B1 by the battery B1 output of the dual channel charger.

Ibat2: The charge current being provided to battery B2 by the battery B2 output of the dual channel battery charger.

Itot: Ibat1 + Ibat2; the sum of the charge currents into batteries B1 and B2.

V1: The output voltage of channel Ch1 which supplies charge current to battery B1 (discussed in the Total Current Limit Mode).

V2: The output voltage of channel CH2 which supplies charge current to battery B2 (discussed in the Total Current Limit Mode).

Vref1: an internal reference voltage in the charger used to regulate the float voltage of battery B1.

Vref2: an internal reference voltage in the charger used to regulate the float voltage of battery B2.

ViLim: An internal reference voltage in the charger used to regulate the Total Current Limit.

Vbat1: Battery B1 voltage as measured at the charger terminals for battery B1. This voltage contains a ripple component due to the IR drop in the cables and battery B1.

Vbat2: Battery B2 voltage as measured at the charger terminals for battery B2. This voltage contains a ripple component due to the IR drop in the cables and battery B2.

Vbat1 ^: Voltage of battery B1 when measured with zero amperes of charge current flowing into battery B1.

Vbat2 ^: Voltage of battery B2 when measured with zero amperes of charge current flowing into battery B2.

Va1: This is voltage Vbat1, but clamped to approximately −1.0 volts D.C.

Va2: This is voltage Vbat2, but clamped to approximately −1.0 volts D.C.

Vb1: This is voltage Va1 with the positive part amplified and clipped, and the negative part processed with unity gain plus 0.4 VDC.

Vb2: This is voltage Va2 with the positive part amplified and clipped, and the negative part processed with unity gain plus 0.4 VDC.

VbcL1: This is the weighted difference of Vbat1 ^ and the average value of Vb1.

VbcL2: This is the weighted difference of Vbat2 ^ and the average value of Vb1.

It should be understood that the foregoing relates only to a limited number of preferred embodiments of the invention which have been by way of example only, and that is intended to cover all change and modifications of the examples of the invention herein chosen for the purposes of the disclosure which do not constitute departures from the spirit and scope of the invention.

What is claimed is:

1. An automatic dual battery charging system, comprising:
    a battery charging circuit having first and second independent channels for charging a respective first and second battery;
    said first channel having a first charging terminal to which said first battery to be charged is connected;
    said second channel having a second charging terminal to which said second battery to be charged is connected;
    circuit control means is said battery charging circuit connected to said first and second channels for sensing the state of charge of said first and second battery and for enabling the same to provide said first and second batteries with a charging current is proportion to the state of charge in said batteries, so that the weaker one of said batteries receives a large charging current, while a stronger one of said batteries receives a less charging current; and
    wherein said circuit control means further comprises a computer means for subtracting a current correction from each of said batteries to compute the charge level of each of said batteries.

2. A battery charging system as claimed in claim 1, further comprising separate first and second electronic bar displays connected to said first and second channels respectively, for indicating the state of charge of said batteries.

3. A battery charging system as clamed in claim 1, wherein said circuit control means further comprises means for interrupting the charging current to each of said batteries, only when no charging current flows, whereby the state of charge of each battery is sensed.

4. A battery charging system as claimed in claim 3, further comprising separate first and second electronic bart displays connected to said first and second channels respectively for indicating the charge level of each of said batteries.

5. A battery charging system as claimed in claim 4, further comprising wires connecting said first and second channels to said first and second batteries respectively, so that said batteries can be remotely located from said battery charging circuit, without introducing electrical resistance of said wires when the charge level to the respective batteries are measured.

* * * * *